(12) United States Patent
Ha et al.

(10) Patent No.: US 10,989,922 B2
(45) Date of Patent: Apr. 27, 2021

(54) AUGMENTED REALITY OPTICS SYSTEM WITH PIN MIRROR

(71) Applicant: Letinar Co., Ltd., Seoul (KR)

(72) Inventors: Jeonghun Ha, Seoul (KR); Jaehyeok Kim, Seoul (KR)

(73) Assignee: LETINAR CO., LTD., Seoul (KR)

( * ) Notice: Subject to any disclaimer, the term of this patent is extended or adjusted under 35 U.S.C. 154(b) by 0 days.

(21) Appl. No.: 15/858,464

(22) Filed: Dec. 29, 2017

(65) Prior Publication Data

US 2019/0204601 A1 Jul. 4, 2019

(51) Int. Cl.
*G02B 27/01* (2006.01)
*F21V 8/00* (2006.01)

(52) U.S. Cl.
CPC ....... *G02B 27/0172* (2013.01); *G02B 27/017* (2013.01); *G02B 6/0035* (2013.01); *G02B 2027/013* (2013.01); *G02B 2027/0105* (2013.01); *G02B 2027/0107* (2013.01); *G02B 2027/0125* (2013.01); *G02B 2027/0127* (2013.01); *G02B 2027/0174* (2013.01); *G02B 2027/0178* (2013.01)

(58) Field of Classification Search
CPC .............. G02B 27/017; G02B 27/0172; G02B 27/0174; G02B 27/0178; G02B 20/0103; G02B 2027/0105; G02B 2027/0107; G02B 2027/0174; G02B 2027/0178; G02B 27/0176

See application file for complete search history.

(56) References Cited

U.S. PATENT DOCUMENTS

| | | | | |
|---|---|---|---|---|
| 3,936,605 A * | 2/1976 | Upton | .................... | G02B 27/01 704/271 |
| 5,539,578 A * | 7/1996 | Togino | ................. | G02B 27/017 345/7 |
| 5,654,827 A * | 8/1997 | Reichert | ............ | G02B 27/0101 359/631 |
| 5,708,529 A * | 1/1998 | Togino | ................. | G02B 27/017 345/8 |
| 5,754,344 A * | 5/1998 | Fujiyama | ........... | G02B 27/0172 359/631 |
| 5,771,124 A * | 6/1998 | Kintz | ................. | G02B 27/0101 359/630 |
| 5,831,712 A * | 11/1998 | Tabata | ............... | G02B 27/0172 351/158 |

(Continued)

*Primary Examiner* — Bao-Luan Q Le
(74) *Attorney, Agent, or Firm* — Rabin & Berdo, P.C.

(57) ABSTRACT

Approaches presented herein enable displaying a virtual image in a real-world or virtual-world environment. More specifically, a virtual image is transmitted, via a virtual image projection component, through a substantially transparent medium onto a set of pinpoint mirrors in contact with the medium. The virtual image is transmitted, via the set of pinpoint mirrors, through the medium onto a set of optical elements that widens a field of view of the virtual image. A view of the virtual image transposed on a real-world or a virtual reality image is provided, via the set of optical elements, to a user looking through the medium. The light forming the virtual image is perceived by the human eye, but, because each pinpoint mirror of the set is smaller than the pupil of the human eye, none of the set of pinpoint mirrors is perceivable by the human eye due to their size.

15 Claims, 7 Drawing Sheets

(56) References Cited

U.S. PATENT DOCUMENTS

| | | | | |
|---|---|---|---|---|
| 5,886,822 | A * | 3/1999 | Spitzer | G02B 27/0172 359/630 |
| 5,886,823 | A * | 3/1999 | Sugano | G02B 27/0018 359/630 |
| 5,982,343 | A * | 11/1999 | Iba | G02B 27/0172 345/8 |
| 6,204,974 | B1 * | 3/2001 | Spitzer | G02B 27/017 359/630 |
| 6,339,411 | B2 * | 1/2002 | Miyazaki | G02B 27/017 345/1.1 |
| 6,353,503 | B1 * | 3/2002 | Spitzer | G02B 27/017 359/630 |
| 6,356,392 | B1 * | 3/2002 | Spitzer | G02B 27/017 345/8 |
| RE37,667 | E * | 4/2002 | Togino | G02B 27/017 345/8 |
| 6,384,982 | B1 * | 5/2002 | Spitzer | G02B 27/017 359/630 |
| 7,001,019 | B2 * | 2/2006 | Takagi | G02B 27/017 351/211 |
| 7,992,996 | B2 * | 8/2011 | Sugihara | G02C 9/00 351/158 |
| 8,000,020 | B2 * | 8/2011 | Amitai | G02B 6/0046 345/7 |
| 8,305,297 | B2 * | 11/2012 | Sugihara | G02B 27/0172 345/8 |
| 8,317,330 | B2 * | 11/2012 | Yamazaki | G02B 27/0172 353/30 |
| 8,337,015 | B2 * | 12/2012 | Sugihara | G02B 27/0172 345/7 |
| 8,456,744 | B2 * | 6/2013 | Dobschal | G02B 27/143 359/630 |
| 8,467,132 | B2 * | 6/2013 | Dobschal | G02B 27/0172 359/630 |
| 8,503,087 | B1 * | 8/2013 | Amirparviz | G02B 5/09 359/630 |
| 8,736,962 | B2 * | 5/2014 | Dobschal | G02B 27/0172 359/630 |
| 8,929,001 | B2 * | 1/2015 | Hotta | G02B 3/08 359/630 |
| 8,970,961 | B2 * | 3/2015 | Dobschal | G02B 3/08 359/630 |
| 9,052,505 | B2 * | 6/2015 | Cheng | G02B 30/26 |
| 9,366,870 | B2 * | 6/2016 | Cheng | H04N 13/346 |
| 9,442,291 | B1 * | 9/2016 | Martinez | G02B 27/0172 |
| 9,442,294 | B2 * | 9/2016 | Urey | G02B 27/0172 |
| 9,625,989 | B2 * | 4/2017 | Wilson | G06T 7/215 |
| 9,733,479 | B2 * | 8/2017 | Schmidt | G02B 3/08 |
| 9,835,866 | B2 * | 12/2017 | Widulle | G02B 5/09 |
| 9,989,768 | B2 * | 6/2018 | Lindig | G02B 27/017 |
| 10,330,937 | B2 * | 6/2019 | Cheng | G02B 5/04 |
| 10,331,207 | B1 * | 6/2019 | Simmons | H04N 13/398 |
| 10,353,203 | B2 * | 7/2019 | Cai | G02B 27/0172 |
| 10,429,646 | B2 * | 10/2019 | Kress | G02B 27/0172 |
| 10,534,180 | B2 * | 1/2020 | Nortrup | G02B 5/04 |
| 10,534,181 | B2 * | 1/2020 | Wu | G02B 6/132 |
| 10,695,612 | B2 * | 6/2020 | Tsukahara | G06F 3/01 |
| 2001/0011967 | A1 * | 8/2001 | Miyazaki | G02B 27/017 345/7 |
| 2002/0051118 | A1 * | 5/2002 | Takagi | G02B 27/017 351/211 |
| 2002/0186179 | A1 * | 12/2002 | Knowles | G02B 27/0172 345/8 |
| 2009/0052047 | A1 * | 2/2009 | Amitai | G02B 6/0046 359/633 |
| 2010/0109977 | A1 * | 5/2010 | Yamazaki | G02B 27/0172 345/8 |
| 2011/0051076 | A1 * | 3/2011 | Sugihara | G02C 9/00 351/158 |
| 2011/0051077 | A1 * | 3/2011 | Sugihara | G02C 9/00 351/158 |
| 2011/0057863 | A1 * | 3/2011 | Sugihara | G02B 27/0172 345/8 |
| 2013/0077175 | A1 * | 3/2013 | Hotta | G02B 3/08 359/630 |
| 2013/0229712 | A1 * | 9/2013 | Kress | G02B 27/0172 359/572 |
| 2013/0250429 | A1 * | 9/2013 | Dobschal | G02B 3/08 359/631 |
| 2014/0267941 | A1 * | 9/2014 | Ellsworth | G02B 27/017 349/5 |
| 2014/0293434 | A1 * | 10/2014 | Cheng | G02B 30/26 359/630 |
| 2015/0268474 | A1 * | 9/2015 | Cheng | G02B 5/04 359/633 |
| 2016/0209656 | A1 * | 7/2016 | Urey | G02B 27/0093 |
| 2016/0313557 | A1 * | 10/2016 | Schmidt | G02B 5/09 |
| 2017/0038834 | A1 * | 2/2017 | Wilson | G06T 7/215 |
| 2017/0123207 | A1 * | 5/2017 | Kress | G02B 27/0172 |
| 2017/0184851 | A1 * | 6/2017 | Lindig | G02B 27/0172 |
| 2017/0219824 | A1 * | 8/2017 | Kress | G02B 27/0172 |
| 2017/0315358 | A1 * | 11/2017 | Masuda | G02B 27/0172 |
| 2018/0003962 | A1 * | 1/2018 | Urey | G02B 27/0172 |
| 2018/0149869 | A1 * | 5/2018 | Bergquist | G02B 27/147 |
| 2018/0203233 | A1 * | 7/2018 | Tsukahara | G02B 27/017 |
| 2018/0234661 | A1 * | 8/2018 | Tsukahara | G06F 1/1694 |
| 2018/0280762 | A1 * | 10/2018 | Tsukahara | G06F 3/0481 |

* cited by examiner

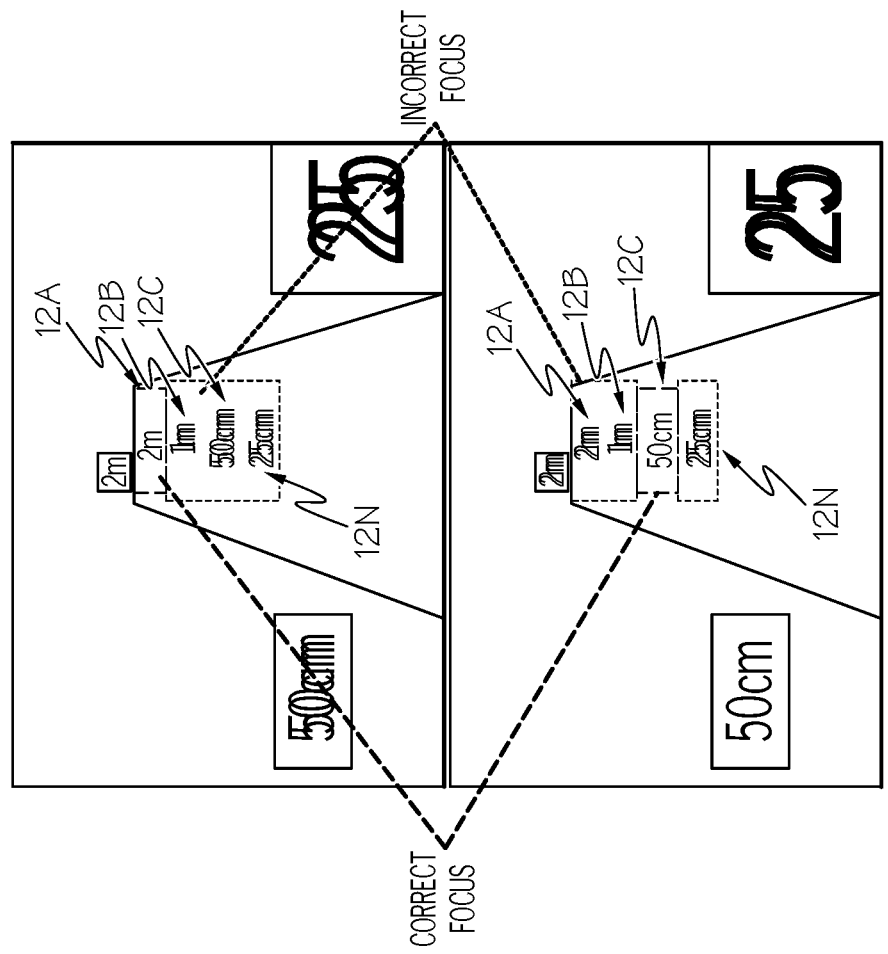
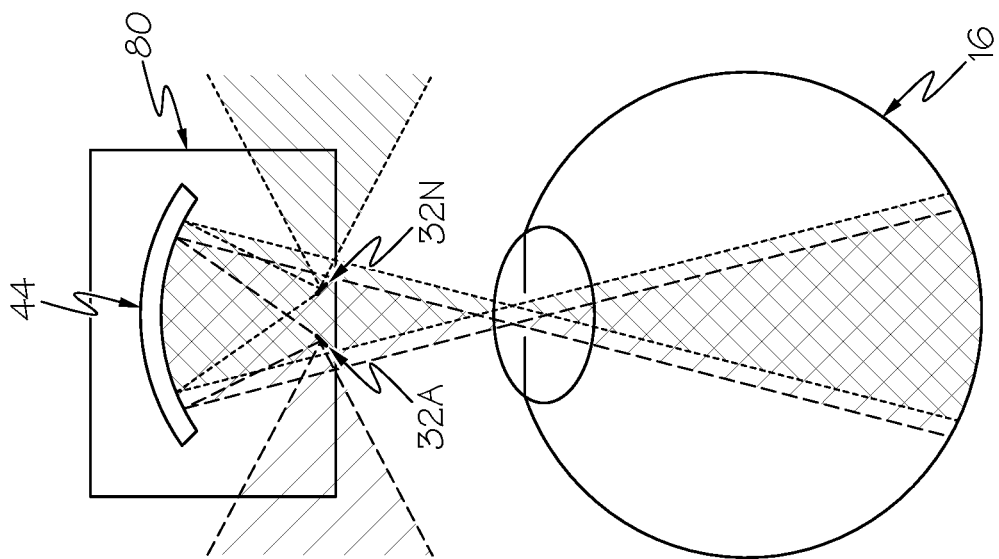
FIG. 5

AUGMENTED REALITY OPTICS SYSTEM WITH PIN MIRROR

CROSS REFERENCE TO RELATED APPLICATION

The present invention is related in part to U.S. patent application Ser. No. 15/858,389, entitled "AUGMENTED REALITY OPTICS SYSTEM WITH PINPOINT MIRROR," filed on Dec. 29, 2017, the entire contents of which are incorporated herein by reference.

TECHNICAL FIELD

The present invention relates generally to virtual image generation in the context of virtual and/or augmented reality and, more specifically, to an improvement to virtual and/or augmented reality technology by using a pinpoint mirror to display a virtual image.

BACKGROUND

Augmented reality (AR) allows a user to live view or indirectly view a physical, real-world environment, in which real-world objects are augmented by computer-generated sensory input such as sound, video, graphics, haptics, and/or GPS data. AR is a type of computer-mediated reality, in which a view of reality is modified by a computer, thereby enhancing the experienced environments or situations. AR techniques are often performed in real time with environmental elements, such as annotating a real object in a live, moving video feed with an information overlay.

In contrast to the enhancing of a user's perception of the real world by AR, Virtual Reality (VR) replaces the real world with a simulated one. Typically, VR uses headsets, haptic feedback devices, or projected environments, to create an imaginary environment in which a user's senses are stimulated by simulated images, sounds, and/or other sensations as if the user were actually in the imaginary environment.

Although AR and VR were originally primarily used in entertainment and gaming environments, other enterprises now use AR and VR. For example, organizations and individuals are increasingly using AR and VR in such areas as knowledge sharing, educating, managing information, and organizing geographically distant meetings.

SUMMARY

Approaches presented herein enable displaying a virtual image in a real-world or virtual-world environment. More specifically, a virtual image is transmitted, via a virtual image projection component, through a substantially transparent medium onto a set of pinpoint mirrors in contact with the substantially transparent medium. The virtual image is then transmitted, via the set of pinpoint mirrors, through the substantially transparent medium onto a set of optical elements. The set of optical elements widens a field of view of the virtual image. A view of the virtual image transposed on a real-world image or a virtual reality image is then provided, via the set of optical elements, to a user looking through the substantially transparent medium. The light forming the virtual image is perceived by the human eye, but, because each pinpoint mirror of the set of pinpoint mirrors is smaller than the pupil of the human eye, none of the set of pinpoint mirrors is perceivable by the human eye due to their size.

One aspect of the present invention includes an augmented reality view-through device comprising: a substantially transparent medium; a set of pinpoint mirrors continuous with the substantially transparent medium; an optical element continuous with the substantially transparent medium; and a virtual image projection component that transmits a virtual image onto the set of pinpoint mirrors, wherein the set of pinpoint mirrors transmits a virtual image onto the optical element and the optical element widens a field of view of the virtual image, such that a user looking through the substantially transparent medium sees the virtual image transposed on a real-world image or a virtual reality image via the optical element.

Another aspect of the present invention includes a method for displaying a virtual image in a real-world environment or virtual-world environment, comprising: transmitting, via a virtual image projection component, a virtual image through a substantially transparent medium onto a set of pinpoint mirrors in contact with the substantially transparent medium; transmitting, via the set of pinpoint mirrors, the virtual image through the substantially transparent medium onto an optical element; widening, via the optical element, a field of view of the virtual image; and providing, via the optical element, a view of the virtual image transposed on a real-world image or a virtual reality image to a user looking through the substantially transparent medium.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 5 shows realization of Maxwellian views of a number of virtual images 12A-N having different focal lengths according to illustrative embodiments.

Figure 1A:
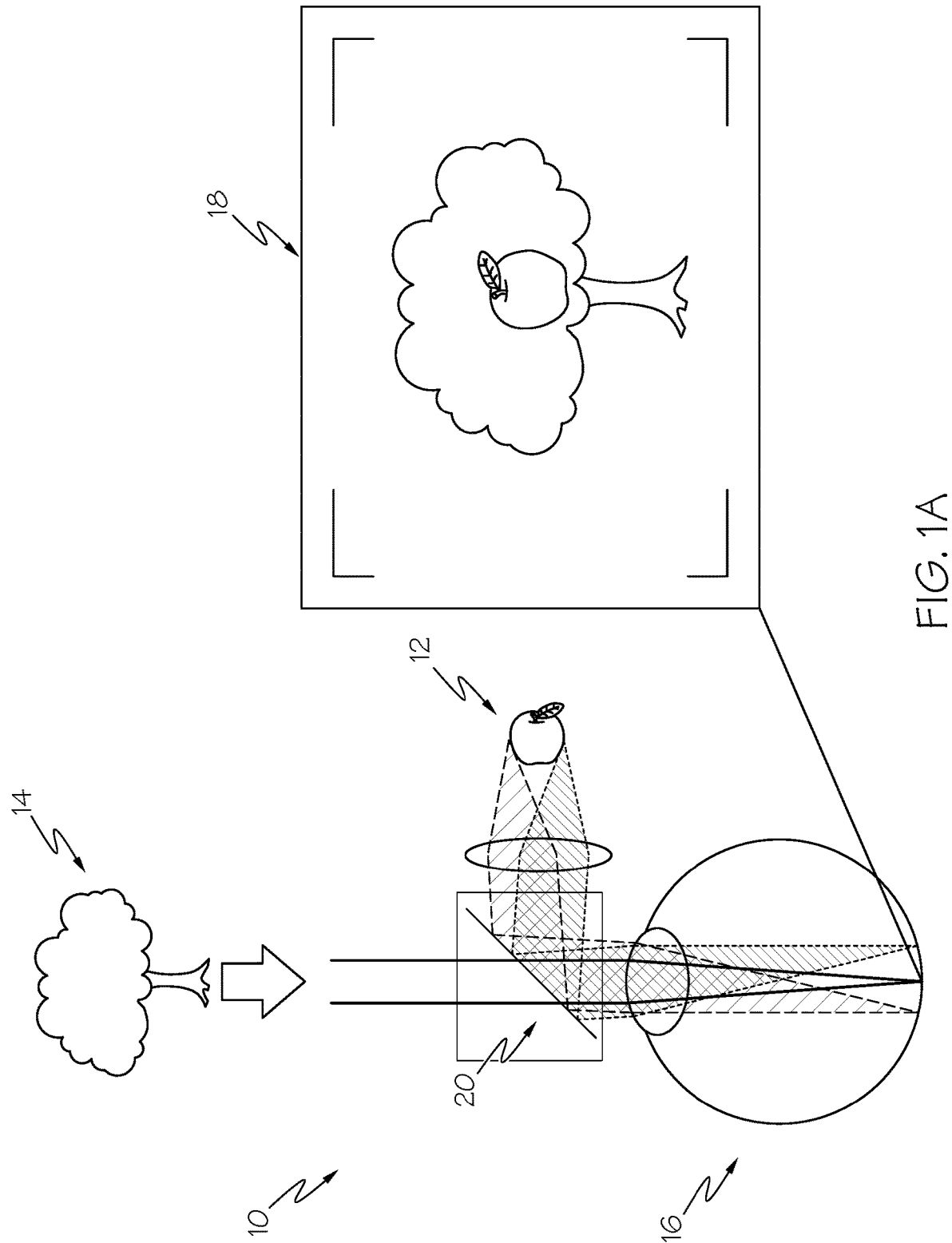
FIGS. 1A and 1B show example conventional optical systems.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", "a set", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As stated above, embodiments described herein provide for displaying a virtual image in a real-world or virtual-world environment. More specifically, a virtual image is transmitted, via a virtual image projection component, through a substantially transparent medium onto a set of pinpoint mirrors in contact with the substantially transparent medium. The virtual image is then transmitted, via the set of pinpoint mirrors, through the substantially transparent medium onto a set of optical elements. The set of optical elements widens a field of view of the virtual image. A view of the virtual image transposed on a real-world image or a virtual reality image is then provided, via the set of optical elements, to a user looking through the substantially transparent medium. The light forming the virtual image is perceived by the human eye, but, because each pinpoint mirror of the set of pinpoint mirrors is smaller than the pupil of the human eye, none of the set of pinpoint mirrors is perceivable by the human eye due to their size.

Conventional view-through AR and/or VR (AR/VR) optical systems combine a virtual image with a real-world image or a virtual-world image that the user is seeing through the view-through system (typically made of a transparent substance, such as glass or other lens material). To accomplish this, the view-through AR/VR optical system projects the virtual image from outside the view of a user of the AR/VR optical system. Typically, the virtual image is projected into the transparent substance from an angle that is roughly perpendicular to the real-world image that the user is observing. The virtual image is redirected toward the user and transposed onto the real-world image or virtual-world image. The inventors of the present invention have discovered several deficiencies with such conventional view-through AR/VR optical systems, however. The techniques discussed herein will provide similar functionality for a virtual image that is transposed onto either a real-world environment or another virtual image forming a virtual-world environment.

In the following discussion, reference will be made to a real-world environment 14. It should be understood that, with respect to AR embodiments of the present invention and discussed existing AR techniques, real-world environment 14 refers to an actual environment in the real world. In the interest of brevity, it should be understood that, with respect to VR embodiments of the present invention and discussed existing VR techniques, real-world environment 14 can be replaced with a virtual-world environment that is visible to a user through a view-through VR optical system.

Firstly, referring now to FIG. 1A, the inventors have found that conventional systems suffer from a problem when a virtual image 12 is combined with a real-world environment 14. In order to create a plausible-appearing virtual image 12 to a human eye 16 in in real-world environment 14 (i.e., combined virtual and real image 18), it is necessary for a conventional AR/VR optical system 10 to combine virtual image 12 in a specific, desired location in real-world environment 14. Thus, virtual image 12 must be made to appear in the same position and have the same focal distance as a real-world object with which virtual image 12 is intended to "interact."

Conventional AR/VR optical systems 10 use conventional optical techniques, such as the use of a half-mirror 20, a light-guide, or a wave-guide to make virtual image 12 appear in the same position and have the same orientation as a real-world object of real-world environment 14. Because these conventional optical techniques are known in the art, they will be discussed only in limited detail here for the purpose of illustration and comparison with embodiments of the present invention. The half-mirror technique can be used to combine real image 14 and virtual image 12 because some light (corresponding to virtual image 12) reflects off of the half-mirror while some other light (corresponding to real image 14) passes through the half-mirror, before entering human eye 16. Because real-world light must pass through the half-mirror, objects from the real world can appear dim. Examples of the use of this technique include Google Glass, Epson Moverio devices, and Meta vision devices. (It will be understood that all trademarks and trade names used herein are the property of their respective owners and are used for illustrative and descriptive purposes only.) The light-guide technique can be used to combine real image 14 and virtual image 12 by using a plurality of half-mirrors to project a divided virtual image 12 that is combined with real image 14 to form a single image. While the light-guide technique can decrease the thickness and size of an AR/VR optical system, this technique also depends on complex light paths that increases the complexity of design and production while causing light to pass through multiple half-mirrors, decreasing light efficiency. The waveguide technique uses Holographic Optical Elements (HOE) and/or Diffractive Optical Elements (DOE) to split a light beam into its component wavelengths, which are then recombined to form a combination of virtual image 12 with real image 14. However, this process can cause the final image (i.e., combined image 18) to suffer chromatic abbreviations, such as failure to focus all colors to a same convergence point.

Figure 1B:
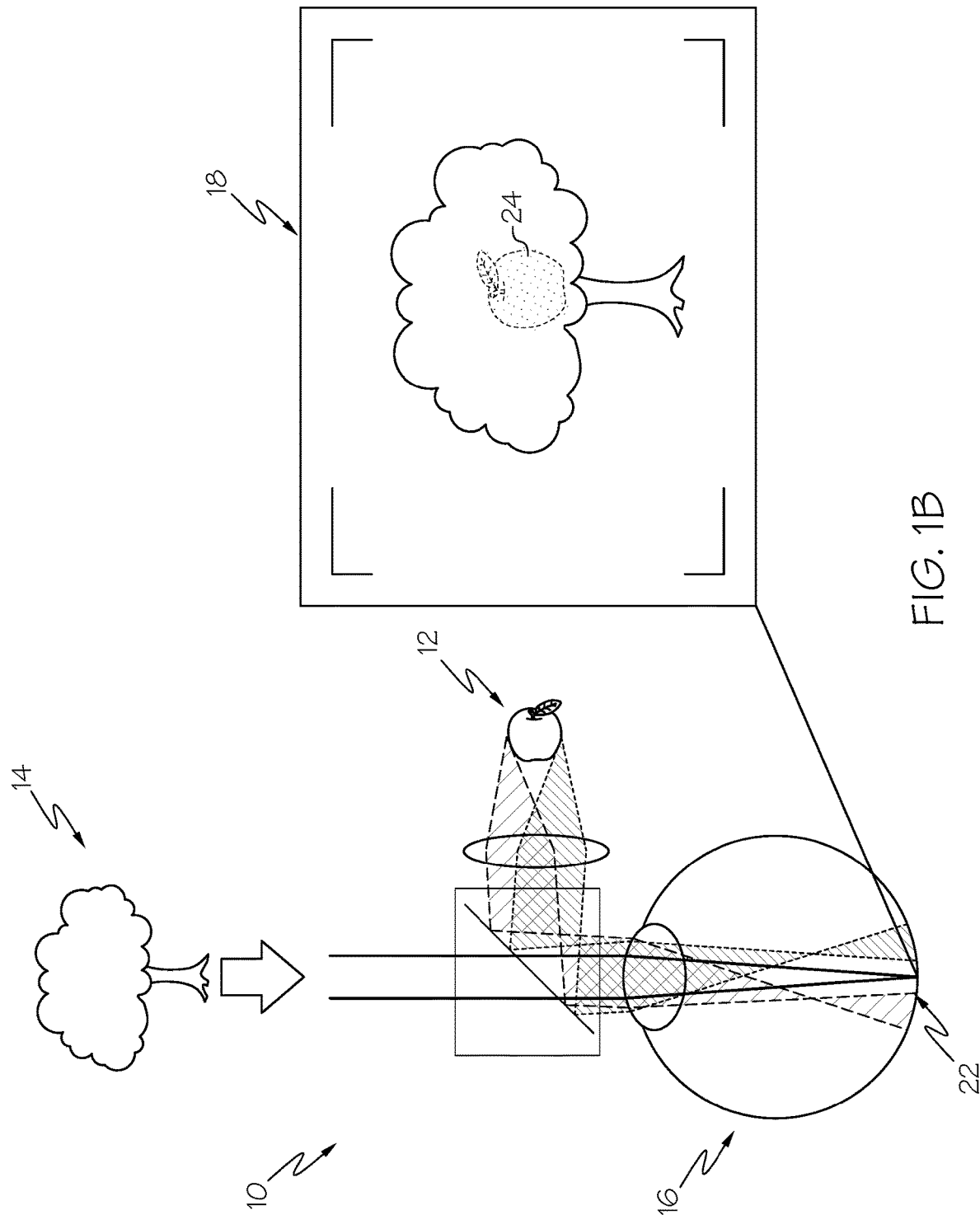

Secondly, referring now to FIG. 1B, the inventors have found that conventional AR/VR optical systems suffer from a problem forming the virtual image. When human eye 16 focuses on real object/image 14, virtual image 12 must also appear clearly formed in the retina 22 of human eye 16. In other words, when virtual image 12 is intended to appear to have the same position relative to real object/image 14, the focus of virtual image 12 must be such that human eye 16 views virtual image 12 clearly when focusing on real object/image 14. This can be particularly difficult because, generally, as the projector used to generate virtual object 12 is a component of the AR/VR optical system, virtual object 12 generated by the projector has a different focal length than real object/image 14, and therefore, may appear as blurred virtual object 24 unless corrected.

Conventional AR/VR optical systems 10 use conventional focal optical techniques, such as adjusting focal length and expanding the depth of field to bring virtual image 12 into focus with real object/image 14. Because these conventional focal techniques are known in the art, they will be discussed only in limited detail here for the purpose of illustration and comparison supra with embodiments of the present invention. In conventional AR/VR optical systems 10 that adjust the focal length of virtual image 12, one or more concave/convex lens and/or mirrors can be used to realize a fixed focal length. In some cases where multiple focal lengths are required, conventional AR/VR optical systems 10 may use conventional focal optical techniques, such as an array of virtual images 12, each corresponding with a different focal length, or an electrically controlled active concave or convex mirror. These techniques for adjusting focal length of virtual image 12 can be inflexible, due to fixed focal lengths, and overly complex, due to focal length workarounds such as those described above.

Some conventional AR/VR optical systems additionally or alternatively attempt to realize a Maxwellian view of virtual image 12 by expanding the depth of field for virtual image 12 with the aim of forming a clear image in retina 22 of virtual image 12 regardless of focal length. Techniques used to attempt to realize a Maxwellian view of virtual image 12 include, a pin hole, a pin light, a laser display, a spot light, and a point light. However, even using these techniques, it remains difficult and complicated to successfully realize a Maxwellian view of virtual image 12. For instance, the pin hole technique can present diffractive problems, necessitating a combiner and an additional optical system to correct. In another example, the spot light and laser light techniques can present an eye-box issue due to the size of the exit pupil, also requiring a combiner and an additional optical system to correct. This is because the appropriate position of eye 16 to view virtual image 12 (i.e., where the light field matches the location of the pupil of eye 16) is limited to a relatively small area when using these techniques, reducing the amount eye 16 can be moved about and still see virtual image 12.

In view of the above, embodiments of the present invention overcome the above described image combining and image forming limitations of conventional AR/VR optical systems. Solutions described herein present AR/VR optical systems that use a reflective surface as an optical element of the system. This reflective surface is smaller than an average diameter of a human pupil under a predetermined lighting condition (i.e., less than 4 mm across) according to a perspective of a user. The solutions described herein use this small reflective surface in combination with one or more optical elements from conventional optical systems, such as those described above with respect to FIG. 1A and FIG. 1B. As will be further discussed and explained below, embodiments of the present invention offer improved view-through ability, a smaller form factor, a wider eye-box, and a wider depth of field when compared with conventional AR/VR optical systems alone.

It should also be understood that, although primarily described herein with respect to AR, embodiments of the present invention can also be used with VR and related VR computer systems (e.g., by converting a portion of the viewing medium from transparent or substantially transparent to opaque or substantially opaque; by introducing an additional opaque or substantially opaque medium into the system; by introducing an additional display on which VR elements can be generated; and/or the like).

Figure 2:
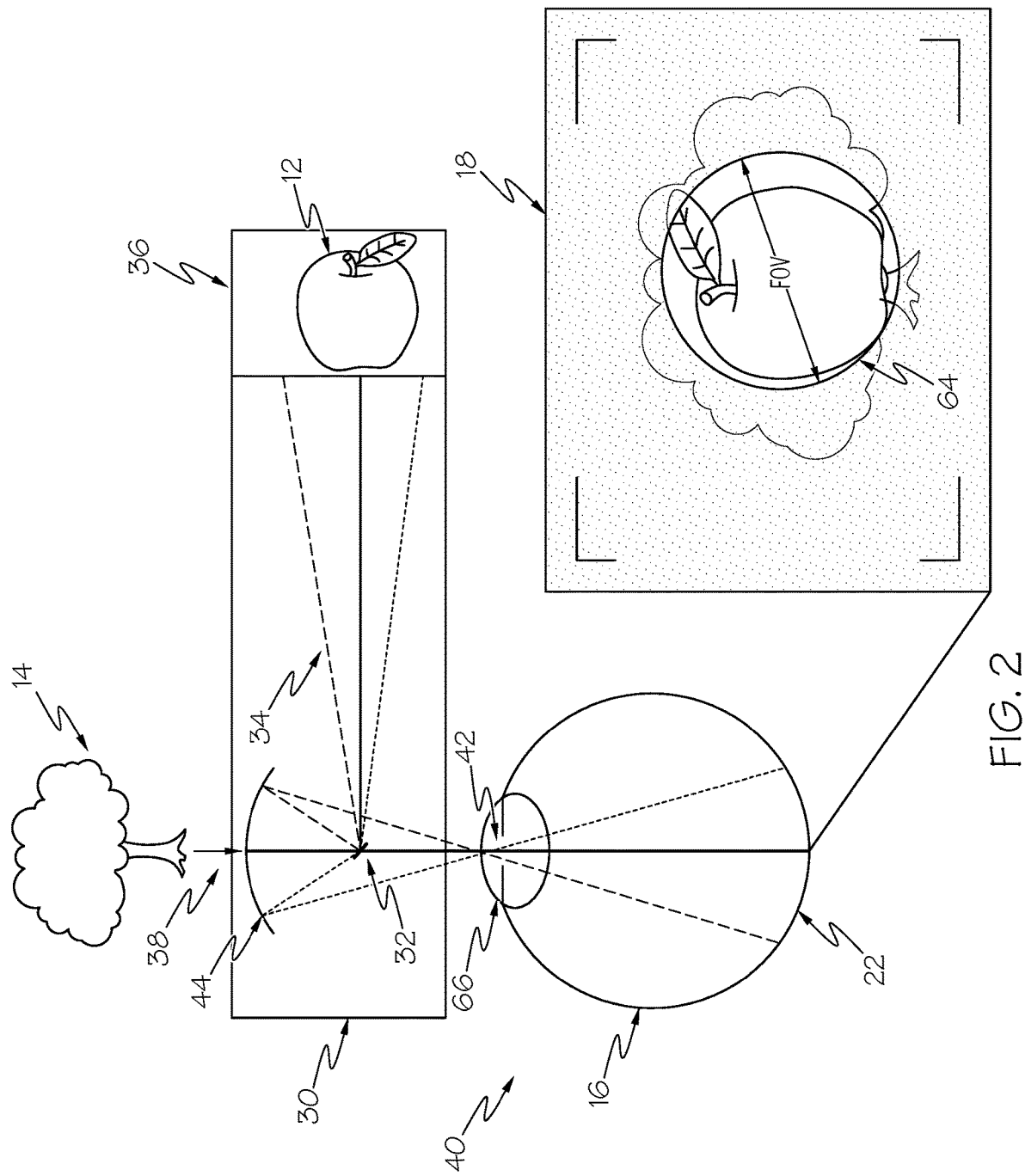
FIG. 2 shows a solution for an augmented reality (AR) or virtual reality (VR) optical system using a pinpoint mirror according to illustrative embodiments.
Figure 3:
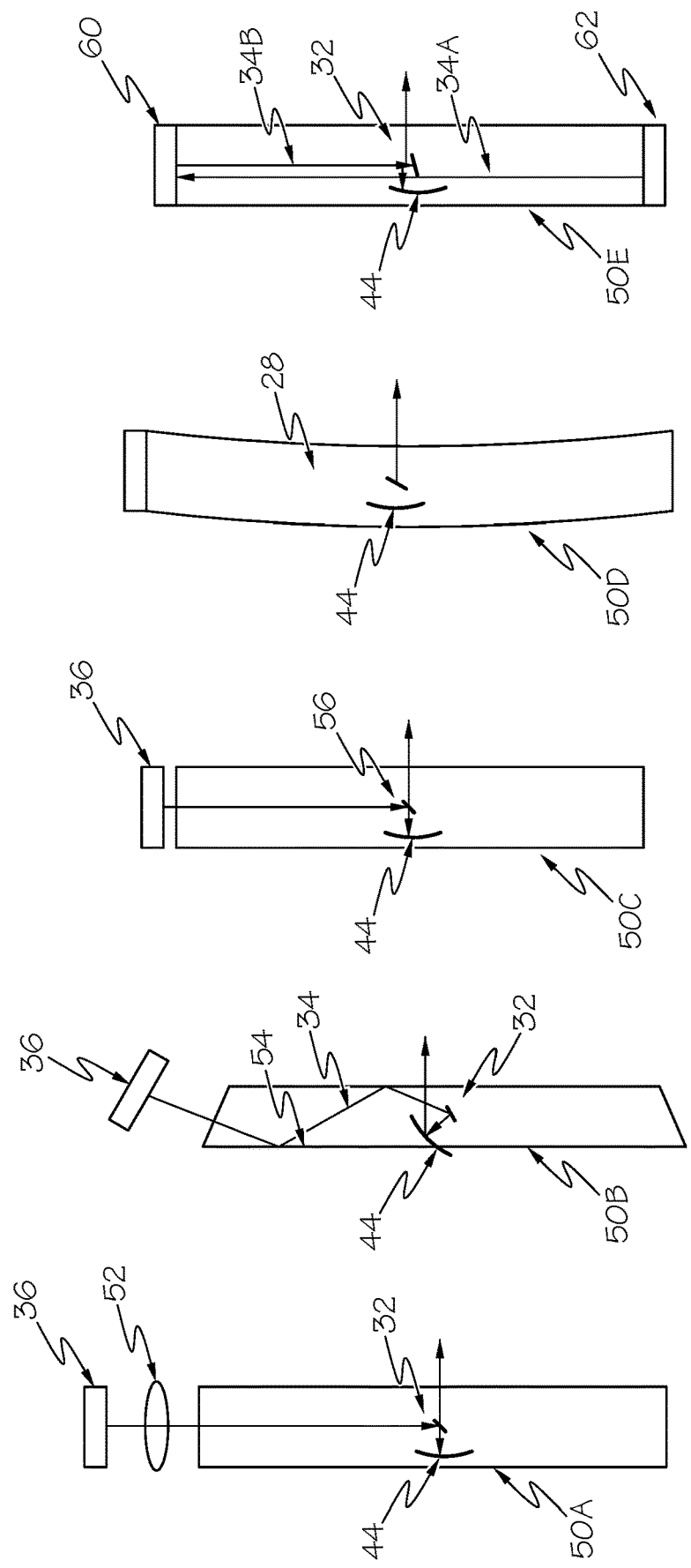
FIGS. 3A-E show further solutions for an AR/VR optical system according to illustrative embodiments.

Referring now to FIG. 2, a solution for an AR/VR optical system according to embodiments of the present invention is shown. As shown in this Figure, a set of pinpoint mirrors 32 (i.e., at least one pinpoint mirror 32) is used as an optical element of AR/VR optical system 30 in combination with a field-of-view-widening optical element 44 in one embodiment of the present invention. Pinpoint mirror 32 is smaller than an average diameter of a human pupil. In some embodiments, pinpoint mirror 32 is less than 4 mm (approximately 5/32 inches) across according to a perspective of the user. In some embodiments of the preset invention, pinpoint mirror 32 can be relatively square or rectangular, with sides of not more than 4 mm from the perspective of the user. In other embodiments, pinpoint mirror 32 can be circular or oval, with a diameter of not more than 4 mm from the perspective of the user.

Pinpoint mirror 32 can be configured to redirect light rays 34 forming virtual image 12 onto field-of-view-widening optical element 44, which, in turn, redirect light rays 34 forming virtual image 12 onto an eye of a user. More specifically, according to embodiments of the present invention, pinpoint mirror 32 is positioned in AR/VR optical system 30 to reflect or refract light rays 34 emitted from virtual image projection component 36 projecting virtual image 12 to field-of-view-widening optical element 44. In some embodiments, optical element 44 can be a concave mirror. In some other embodiments, optical element 44 can be a Fresnel concave mirror, a HOE, a DOE, or a magnifying lens.

Optical element 44 reflects, refracts, or otherwise directs light 34 from pinpoint mirror 32 (from virtual image projection component 36) to human eye 16 of a user when human eye 16 of the user is positioned at display location/area 40 to view real-world light rays 38 from real-world environment 14 or a particular real-world object in real-world environment 14. In some embodiments, field-of-view-widening optical element 44 can be purely reflective. In such an embodiment, field-of-view-widening optical element 44 blocks some real-world light rays 38 from real-world environment 14. In this embodiment having a purely reflective field-of-view-widening optical element 44, AR/VR optical system 30 can deliver virtual reality (VR) imagery to eye 16 of a user. In some other embodiments, field-of-view-widening optical element 44 can be semi-transparent. For example, field-of-view-widening optical element 44 can be a concave half-mirror that permits some real-world light rays 38 from real-world environment 14 to pass through field-of-view-widening optical element 44 and into eye 16 of a user. In many embodiments, in order to achieve a wide field of view, field-of-view-widening optical element 44 is larger across, when viewed from the perspective of a user, than pupil 42 of human eye 16.

Because pinpoint mirror 32 is smaller (i.e., under 4 mm) than pupil 42 of human eye 16, the user cannot recognize or distinguish pinpoint mirror 32 as a mirror. Rather, should eye 16 of the user attempt to focus on pinpoint mirror 32, the user will only see virtual image 12 in combined image 18. This is because when an object smaller than a pupil is located close to the pupil, that object cannot be seen. It should be understood that the measurement of 4 mm across of pinpoint mirror 32 is with respect to the perceived length of pinpoint mirror 32 when viewed from display location/area 40 and not the actual length across pinpoint mirror 32. For instance, in the case that pinpoint mirror 32 is placed at a 45° angel from virtual image projection component 36, then the actual length of pinpoint mirror 32 can be $4\sqrt{2}$ mm (~5.7 mm), while the perceived length of pinpoint mirror 32 at display area 40 remains 4 mm.

In some embodiments, pinpoint mirror 32 and/or field-of-view-widening optical element 44 are continuous with substantially transparent medium 28. For example, in some embodiments, pinpoint mirror 32 and field-of-view-widening optical element 44 are inserted into or embedded within substantially transparent medium 28 which forms the body of AR/VR optical system 30. In embodiments used for VR, the medium between pinpoint mirror 32 and/or field-of-view-widening optical element 44 and eye 16 can be substantially transparent medium 28, while the medium distal from eye 16 with respect to pinpoint mirror 32 and/or field-of-view-widening optical element 44 can be opaque, semi-opaque, or otherwise capable of displaying a VR environment. In some other embodiments, pinpoint mirror 32 and/or field-of-view-widening optical element 44 are on a surface of substantially transparent medium 28 which forms the body of AR/VR optical system 30. In some embodiments, substantially transparent medium 28 can be a lens material, such as glass or plastic (e.g., acrylic, polycarbonate). In some other embodiments, pinpoint mirror 32 and/or field-of-view-widening optical element 44 can be inserted into or held by a frame. AR/VR optical system 30 can transmit virtual image 12 from virtual image projection component 36 from outside the view of a user of AR/VR optical system 30 onto pinpoint mirror 32, which redirects virtual image 12 to field-of-view-widening optical element 44 directed towards display location/area 40 such that a user looking through substantially transparent medium 28 sees virtual image 12 transposed on real-world image 14. For example, in some embodiments, virtual image projection component 36 transmits virtual image 12 to pinpoint mirror 32 through a first surface of substantially transparent medium 28 (e.g., a lens material) and a user looking through substantially transparent medium 28 sees virtual image 12 transposed on real-world image/environment 14 through a second surface of substantially transparent medium 28, wherein the second surface is not opposite the first surface. In an embodiment, virtual image projection component 36 may project virtual image 12 from an angle that is roughly perpendicular to real-world image 12 that the user is observing, although any angle of projection can be utilized for the purpose of this invention. It should be understood that, although the embodiment shown in FIG. 2 shows a face of virtual image projection component 36 as being perpendicular to display location/area 40 and real-world environment 14, with pinpoint mirror 32 rotated 45° from virtual image projection component 36, this need not be the case. In some embodiments, virtual image projection component 36 can be oriented anywhere except directly behind or in front of eye 16 and real-world environment 14.

The use of pinpoint mirror 32 in combination with a field-of-view-widening optical element 44 in AR/VR optical system 30 overcomes the problems combining virtual image 12 with real-world environment 14 discussed above with respect to conventional AR/VR optical system 10. Unlike previous solutions to combining virtual image 12 with real-world environment 14, embodiments of the present invention do not alter virtual image 12 or the perception of real-world environment 14 during the combining process. Unlike the use of a half-mirror or a light-guide that contains multiple half mirrors, pinpoint mirror 32 does not dim real-world environment 14 or virtual image 12 or reduce light efficiency. Further, unlike the HOE and/or DOE used by a waveguide, pinpoint mirror 32 of embodiments of the present invention does not risk chromatic abbreviations to virtual image 12. Moreover, the use of pinpoint mirror 32 in AR/VR optical systems permits the AR/VR optical systems to be notably less complex and bulky than conventional AR/VR optical systems utilizing a light-guide or waveguide. Accordingly, pinpoint mirror 32 permits an AR/VR optical system to be relatively simple, thereby taking up little space, while maintaining the integrity of virtual images and presenting an accurate view-through perception of the real world.

The use of pinpoint mirror 32 in AR/VR optical system 30 in combination with a field-of-view-widening optical element 44 further permits the formation of a Maxwellian view device that overcomes the problems with forming virtual image 12 in focus with real-world environment 14 discussed above with respect to conventional AR/VR optical system 10. By using pinpoint mirror 32 as an optical element, AR/VR optical system 30 removes any need to adjust focal length. Pinpoint mirror 32 accomplishes this by instead expanding the depth of field to bring virtual image 12 into focus with real object/image 14. As such, the use of pinpoint mirror 32 in AR/VR optical systems permits the AR/VR optical systems to be notably less complex and bulky than conventional AR/VR optical systems that adjust the focal length by utilizing, for example, an array of concave/convex lens and/or mirrors or an array of virtual images. Furthermore, by expanding the depth of field using pinpoint mirror 32, AR/VR optical system 30 can apply a pin hole effect to virtual image 12, thereby achieving a Maxwellian view without the use of a combiner or other corrective optical systems.

Furthermore, the use of field-of-view-widening optical element 44, and more specifically, a concave mirror, in conjunction with pinpoint mirror 32, permits field of view 64 to be significantly wider than the field of view resulting from using pinpoint mirror 32 alone. Field-of-view-widening optical element 44 prevents light 34, directed by pin mirror 32 from virtual image projection component 36 to eye 16, from being blocked by a shadow from iris 66 of eye 16. As such, field-of-view-widening optical element 44 prevents a portion of virtual image 12 in combined image 18 from being blocked by iris 66 and from failing to make contact with retina 22. To this extent, the introduction of a concave mirror subsequent to pinpoint mirror 32 in the path of light rays 34 from virtual image projection component 36 to eye 16 permits light rays 34 to be directed so as to avoid iris 66 of eye 16, thereby preventing a shadow forming from iris 66 on retina 22.

It should be understood that field-of-view-widening optical element 44 (e.g., a half or full concave mirror) guides the light of virtual image 12 to eye 16 of the user, with pupil 42 of the user acting as a virtual pinhole for virtual image 12. As such, in some embodiments of the present invention, the focus of virtual image 12 must be adjusted to compensate for the distance between field-of-view-widening optical element 44 and eye 16. In some embodiments, the focus of virtual image 12 can be fixed to correspond with a fixed distance between field-of-view-widening optical element 44 and eye 16. In other embodiments, where the distance between field-of-view-widening optical element 44 and eye 16 may vary, the focus of virtual image 12 can be adjustable (e.g., with a user-manipulated focuser or a computer-controlled system configured to automatically adjust the focus). In either case, an additional optical module, such as a lens and/or mirror, can be used to adjust the focus of virtual image 12. For example, in some embodiments, a lens (within or outside of substantially transparent medium 28) between virtual image projection component 36 and pin mirror 32 can be used to adjust the focus of virtual image 12 for eye 16. In another example, in some embodiments, light forming virtual image 12 from virtual image projection component 36 can first be reflected by a mirror (e.g., a concave mirror) that focuses virtual image 12 before virtual image 12 is transmitted to pin mirror 32. Although other techniques for adjusting a focus of virtual image 12 for eye 16 will be apparent to those trained in the art and are within the scope of embodiments of the present invention, techniques for adjusting the focus of an image are known in the art and therefore will not be discussed in further detail here.

In some embodiments, AR/VR optical system 30 comprises a substantially transparent medium 28 (e.g., a lens in the shape of a rectangle or other three-dimensional shape) in which pinpoint mirror 32 and/or field-of-view-widening optical element 44 are embedded. In this embodiment, light rays 34 from virtual image projection component 36 projecting virtual image 12 are transmitted into substantially transparent medium 28 from a side of substantially transparent medium 28 and are reflected off of pinpoint mirror 32 onto field-of-view-widening optical element 44 from which virtual image 12 is redirected to display area 40, such that a user observes combination 18 of virtual image 12 with real-world environment 14.

It should be understood that, although the embodiment shown in FIG. 2 shows a face of virtual image projection component 36 as being perpendicular to viewing location/area 40 and real-world environment 14, with pinpoint mirror 32 rotated 45° from virtual image projection component 36 and field-of-view-widening optical element 44 between viewing location/area 40 and real-world environment 14, this need not be the case. In some embodiments, virtual image projection component 36 can be oriented anywhere except directly behind or in front of eye 16 and real-world environment 14, with the locations and orientations of pinpoint mirror 32 and field-of-view-widening optical element 44 adjusted accordingly to redirect light 34 from virtual image projection component 36 to eye 16.

It will be readily understood that many variations in AR/VR optical system 30 having pinpoint mirror 32 are envisioned beyond that shown for the purpose of illustration in FIG. 2. In some other embodiments, AR/VR optical system 30 comprises a frame in which pinpoint mirror 32 and/or field-of-view-widening optical element 44 are held. In some other embodiments of the present invention, pinpoint mirror 32 can be modified based on a desired path of light rays 34 from virtual image projection component 36. In some such embodiments, pinpoint mirror 32 can comprise a reflective element, such as a mirror. In some other such embodiments, pinpoint mirror 32 can comprise a refractive element for redirecting, but not reflecting, light rays 34 from virtual image projection component 36 to field-of-view-widening optical element 44, such as a prism or lens. In some embodiments, pinpoint mirror 32 can have an essentially completely reflective surface or an essentially completely refractive surface. In still other such embodiments, some combination of a reflective and a refractive element can be employed as the optical element of AR/VR optical system 30.

Furthermore, in some embodiments, the opacity of pinpoint mirror 34 can vary (e.g., from 0 to about 100%) based on a display objective for virtual image 12. For example, in some cases, a larger pinpoint mirror may cause a brightness of virtual image 12 to decrease below an acceptable amount. In that case, the transparency of pinpoint mirror 32 can be increased or a semi-transparent pinpoint mirror 32 can be used in AR/VR optical system 300 to raise overall brightness. Moreover, depending on a display objective for virtual image 12, pinpoint mirror 32 can be made of any variety of substances with different refractive indexes. For example, in some embodiments, the material of pinpoint mirror 32 can be translucent, a Holographic Optical Element (HOE), metal, etc.

Furthermore, in some embodiments of the present invention, a position and orientation of pinpoint mirror 32 can vary based on a desired path of light rays 34 from virtual image projection component 36 to field-of-view-widening optical element 44. For instance, the yaw, roll, and/or pitch of pinpoint mirror inserted in the lens material of AR/VR optical system 30 can be selectively applied (e.g., between 0° and 180°) as required to correctly show virtual image 12 in real-world environment 14. In still further embodiments, the size of pinpoint mirror 32 can vary. The associated depth of field increases as the size of pinpoint mirror 32 increases; however, according to most embodiments of the present invention, it is desirable to keep pinpoint mirror 32 smaller than the size of human pupil 42. Therefore, an AR/VR optical system intended to operate in low lighting conditions (e.g., night-vision goggles) can, in some embodiments have a larger pinpoint mirror (e.g., up to 8 mm in diameter), while AR/VR optical systems intended to operate in high lighting conditions (e.g., sun glasses) can, in some embodiments have a smaller pinpoint mirror (e.g., less than 2 mm in diameter). In some other embodiments, the amount of light entering pupil 42 of eye 16 can be controlled (e.g., by adjusting a brightness of virtual image 12 and real-world environment 14) in order to prevent pupil 42 from contracting to a size smaller than pinpoint mirror 32 and/or to prevent the field of view from declining excessively.

In some further embodiments, the reflective or refractive surface of pinpoint mirror 32 can perform the same functions as a concave or convex optical element. In still other embodiments, the reflective or refractive surface of pinpoint mirror 32 can perform the same functions as a free-surface optical element, such as an optical element with a spherical, aspherical, conic, toroid, or anamorphic surface.

Referring now to FIG. 3A-E, further embodiments of a solution for an AR/VR optical system according to embodiments of the present invention are shown. In some embodiments of the present invention, pinpoint mirror 32 and field-of-view-widening optical element 44 (e.g., a concave mirror) can be used in an AR/VR optical system having conventional optical system components, as a Maxwellian view can still be easily realized in such cases. For instance, as shown in extra optical element system 50A of FIG. 3A, additional optical element 52 can be placed between virtual image projection component 36 and pinpoint mirror 32. Optical element 52 can be configured to direct light from virtual image projection component 36 to pinpoint mirror 32. In some embodiments, this additional optical element 52 can be located external to a substantially transparent medium 28 of extra optical element system 50A or embedded in substantially transparent medium 28. Additional optical element 52 can include any conventional optical element, such as a convex or concave lens or mirror. In the example shown in FIG. 3A, convex lens 52 can be used to adjust a focus of virtual image 12, while pinpoint mirror 32 extends the field of view of virtual image 12. In another embodiment, as shown in AR/VR optical system using total reflection 50B of FIG. 3B, reflective surface 54 on an inner face of the substantially transparent medium 28 of system 50B can be used to direct light rays 34 from virtual image projection component 36 to pinpoint mirror 32. In some embodiments, reflective surface 54 can be a mirror or other reflective material. In some embodiments, reflective surface 54 can be totally or only partially reflective.

In some embodiments of the present invention, substantially transparent medium 28 housing pinpoint mirror 32 can have one or more curved elements. For example, in some embodiments, pinpoint mirror 32 can be curved pinpoint mirror 56, as shown in AR/VR optical system having curved pinpoint mirror 50C of FIG. 3C. Such embodiments may be useful in instances where it is necessary for pinpoint mirror 32 to enlarge or diminish virtual object 12. In some other embodiments, substantially transparent medium 28 of curved formation AR/VR optical system 50D of FIG. 3D can be curved. Such embodiments may be useful in instances where it is desirable for substantially transparent medium 28 of system 3D to be curved, such as in a pair of eyeglasses, sunglasses, or other eyewear.

In some embodiments of the present invention, virtual image projection component 36 can be any type of image projector or image display device typically used with an AR/VR optical system, such as an organic light-emitting diode (OLED), a light-emitting diode on Silicon (LEDOS), a liquid-crystal display (LCD), a liquid-crystal on Silicon (LCOS) component, or a micro light-emitting diode (MicroLED). For example, in one embodiment, virtual image projection component 36 is a LCOS display 60. As shown in AR/VR optical system 50E of FIG. 3E, because LCOS display 60 is reflective, LCOS display 60 can be used as an optical element. For instance, LCOS display 60 can combine a first virtual image 12 from a first virtual image projection component 36 (e.g., LCOS BLU display 62, which is backlit) by redirecting light rays 34A of the first virtual image 12 onto pinpoint mirror 32, while simultaneously directing light rays 34B from a second virtual image 12 displayed on LCOS display 60 at pinpoint mirror 32. This technique can be used to combine two or more virtual images 12 for viewing by a user as part of the same combined real and virtual image 18.

Figure 4:
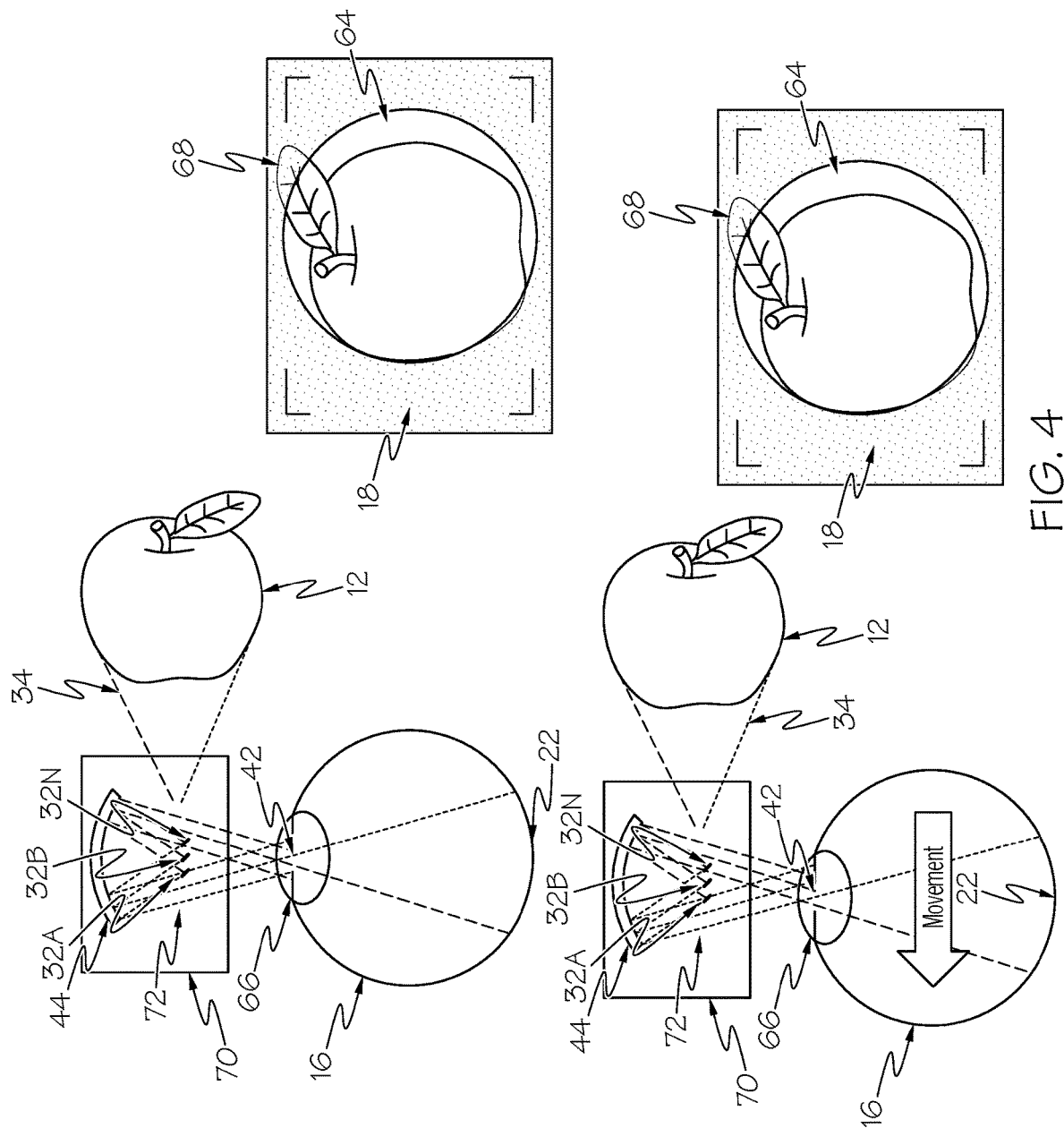
FIG. 4 shows a solution for an AR/VR optical system using an array of pinpoint mirrors according to illustrative embodiments.

Referring now to FIG. 4, embodiments of the present invention using an array of pinpoint mirrors in combination with a field-of-view-widening optical element 44 to expand an eye-box of AR/VR optical system 70 will be shown and discussed. As shown in this Figure, an array 72 comprising a plurality of pinpoint mirrors 32A-N is used collectively along with field-of-view-widening optical element 44 (e.g., a concave mirror) as the optical element of AR/VR optical system 70 in one embodiment of the present invention. Virtual image projection component 36 can transmit a first portion of virtual image 12 through substantially transparent medium 28 onto a first pinpoint mirror of the plurality of pinpoint mirrors 32A-N and transmit a second portion of virtual image 12 through substantially transparent medium 28 onto a second pinpoint mirror of the plurality of pinpoint mirrors 32A-N.

In some embodiments, array 72 of pinpoint mirrors 32A-N can be a linear array. In some other embodiments, array 72 can be two-dimensional, having both a plurality of pinpoint mirrors 32A-N arranged horizontally as well as vertically. In still other embodiments, array 72 can be three-dimensional, having a plurality of pinpoint mirrors 32A-N arranged along a x-axis, y-axis, and z-axis. In still other embodiments, array 72 can also be an irregular array. As in AR/VR optical system 30, each pinpoint mirror 32A-N is smaller than the typical diameter of a human pupil (i.e., less than 4 mm or 5/32 inches across). Each pinpoint mirror 32 is positioned in AR/VR optical system 70 to reflect or refract, via field-of-view-widening optical element 44, light rays 34 emitted from a virtual image projection component 36 (not shown) transmitting virtual image 12 to human eye 16 of a user when human eye 16 of the user is positioned at a viewing location/area. Because each pinpoint mirror 32A-N is smaller (i.e., under 4 mm) than pupil 42 of human eye 16, the user cannot recognize or distinguish any of the pinpoint mirrors 32A-N as mirrors.

The use of array 72 of pinpoint mirrors 32A-N widens field of view 64 of virtual image 12, reducing shadow 68. This is because a plurality of pinpoint mirrors 32A-N can work in tandem to reflect or refract light rays 34 from different portions of virtual image 12 onto different portions of retina 22 of eye 12 by using different angles of entry with respect to pupil 42. This diminishes the ability of iris 66 to block light rays 34 from entering eye 16. As such, a wider field of view can be realized on retina 22 and ultimately is seen by the user. Field-of-view-widening optical element 44 (e.g., a concave mirror), also contributes to a wider field of view 64, as already discussed with reference to FIG. 3 above.

Moreover, the use of array 72 of pinpoint mirrors 32A-N results in a wider eye-box and a more flexible exit pupil, giving eye 16 more room to move about while still seeing virtual image 12. This is because, as eye 16 moves (e.g., to the left), neighboring pinpoint mirror 32A performs the same role as previously performed by pinpoint mirror 32B, permitting the user to continue seeing a same appearance of virtual image 12, regardless of a position of eye 16. Without array 72 of pinpoint mirrors 32A-N, field of view 64 would still be wide but when eye 16 moves to the left or right, the original exit pupil does not fit through pupil 42 because shadow 68 from iris 66 blocks a portion of virtual image 12, and therefore only an unblocked portion of virtual image 12 would be visible to eye 16. To this extent, the addition of array 72 of pinpoint mirrors 32A-N to AR/VR optical system 30 to form AR/VR optical system 70 permits a neighboring exit pupil to replace the original exit pupil, thereby expanding the range of the eye box.

In some embodiments, AR/VR optical system 70 can comprise substantially transparent medium 28 (e.g., shaped as a rectangular lens) in which array 72 of pinpoint mirrors 32A-N and/or field-of-view-widening optical element 44 is embedded. Each pinpoint mirror 32A-N is placed at an interval from other pinpoint mirrors 32A-N in array 72. In some embodiments of the present invention, the interval can vary depending on to what degree it is desired to superimpose the images produced by each pinpoint mirror. To reduce the amount of overlap, in some embodiments, the interval is about the diameter of pupil 42, in other words, approximately 4 mm. Light rays 34 from virtual image projection component 36 (not shown) transmitting virtual image 12 can enter the material at a side of the material and can be reflected off of one or more pinpoint mirrors 32A-N to field-of-view-widening optical element 44, which, in turn can direct light rays 34 to display area 40 (not shown), where a user may observe combination 18 of virtual image 12 with real-world environment 14 (not shown).

In some embodiments, the interval between two pinpoint mirrors 32A-N can vary depending on the use and function of AR/VR optical system 70 (i.e., in order to show virtual image 12 as desired). In some embodiments, array 72 can contain several rows and/or columns of pinpoint mirrors 32A-N, depending on the use and function of AR/VR optical system 70. Further, depending on a number of pinpoint mirrors 32A-N in array 72 and the interval between pinpoint mirrors 32A-N, the field of view associated with AR/VR optical system 70 can be expanded from approximately 10° up to 180°. This can be accomplished using an array of pinpoint mirrors. As the number of pinpoint mirrors 32A-N in array 72 increases horizontally, the field of view increases horizontally. Likewise, as the number of pinpoint mirrors 32A-N in array 72 increases vertically, the field of view increases vertically. It will be further understood, without additional elaboration here, that all variations discussed above with respect to AR/VR optical system 30 having a single pinpoint mirror 32 can also be implemented in embodiments of AR/VR optical system 70 having array 72 of pinpoint mirrors 32A-N.

Referring now to FIG. 5, an embodiment of the present invention which enables Maxwellian views of a number of virtual images 12A-N having different focal lengths is depicted. In this embodiment, pinpoint mirrors 32A-N of a plurality of pinpoint mirrors and field-of-view-widening optical element 44 are embedded in substantially transparent medium 28 of AR/VR optical system 80. Each pinpoint mirror 32A-N is associated with a different virtual image 12A-N of a plurality of virtual images. Virtual images 12A-N are fabricated to have different focal length than at least one other fabricated virtual image of the plurality of virtual images 12A-N. A first virtual image projection component 36 (not shown) transmits first virtual image 12A through substantially transparent medium 28 onto first pinpoint mirror 32A of plurality of pinpoint mirrors 32A-N associated with first virtual image 12A. A second virtual image projection component 36 (not shown) transmits second virtual image 12B through substantially transparent medium 28 onto second pinpoint mirror 32B of plurality of pinpoint mirrors 32A-N associated with second virtual image 12B.

When eye 16 looks through AR/VR optical system 80, eye 16 can see light from each virtual image 12A-N reflected into field-of-view-widening optical element 44 by the pinpoint mirror 32A-N associated with that virtual image. However, because virtual images 12A-N have been fabricated to have different focal lengths, when eye 16 focuses on one of the virtual images 12A-N, the other virtual images 12A-N will appear blurry to eye 16. These different focal lengths permit eye 16 to interpret this perceived blurring and focusing as indicating that virtual images 12A-N appear to be different distances from eye 16. As such, each image of a group of virtual images 12A-N is made to appear to be a different distances from 16, creating a tableau of virtual images 12A-N having depth. For example, as shown in FIG. 5, when eye 16 attempts to focus on virtual image 12A, virtual images 12B-N simultaneously appear out of focus to eye 16. Likewise, when eye 16 attempts to focus on virtual image 12C, virtual images 12A, 12B, and 12N simultaneously appear out of focus to eye 16. Therefore, virtual image 12B appears to be closer to eye 16 than virtual image 12A, but further away from eye 16 than virtual image 12C.

Figure 6:
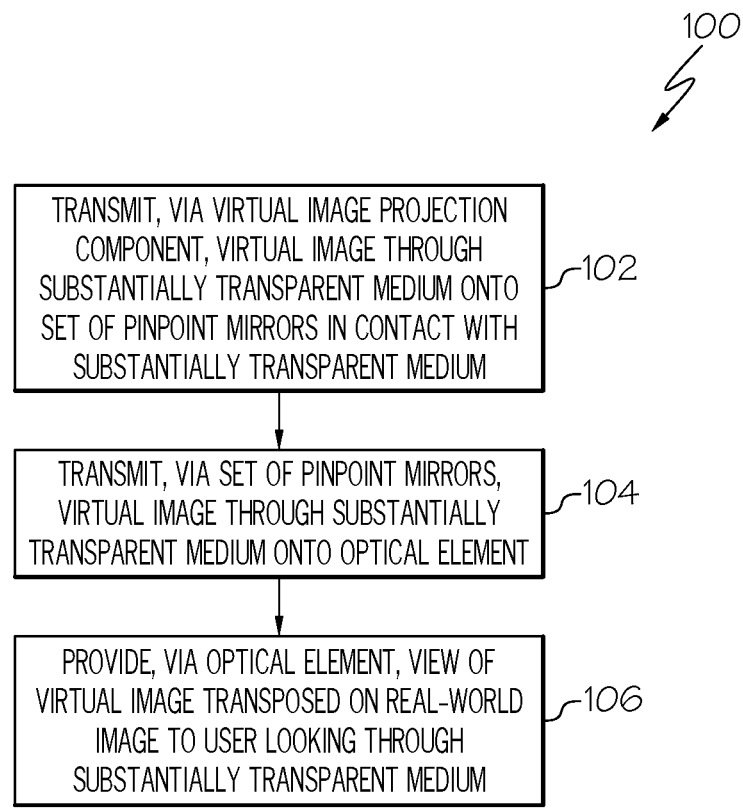
FIG. 6 shows a process flowchart for carrying out an embodiment of the preset invention according to illustrative embodiments.

Referring now to FIG. 6, a process flowchart 100 for carrying out an embodiment of the preset invention is shown. Specifically, flowchart 100 shows a method for displaying a virtual image 12 in a real-world environment 14 or a virtual-world environment. At 102, a virtual image projection component 36 transmits a virtual image 12 through a substantially transparent medium 28 onto a set of pinpoint mirrors 32 in contact with the substantially transparent medium 28. At 104, the set of pinpoint mirrors 32 transmit the virtual image 12 through the substantially transparent medium 28 onto an optical element 44. At 106, the optical element 44 widens a field of view of the virtual image 12. At 108, the optical element 44 provides a view of the virtual image 12 transposed on a real-world image 14 or a virtual reality image to a user looking through the substantially transparent medium 28.

Process flowchart 100 of FIG. 6 illustrates the architecture, functionality, and operation of possible implementations of systems and methods of the present invention. In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. An augmented reality view-through device comprising:
   a substantially transparent medium having a front surface and a rear surface;
   a set of pinpoint mirrors embedded in the substantially transparent medium, wherein at least one pinpoint mirror of the set of pinpoint mirrors is a full mirror between 2 mm and 8 mm across, the set of pinpoint mirrors arranged such that an end of each of the pinpoint mirrors closest to a front surface of the substantially transparent medium is spaced apart from the front surface, and an end of each of the pinpoint mirrors closest to a rear surface of the substantially transparent medium is spaced apart from the rear surface, and each of the pinpoint mirrors generates a pinhole effect on the virtual image reflected by the pinpoint mirrors;
   an optical element embedded in the substantially transparent medium such that an end of the optical element closest to a front surface of the substantially transparent medium is spaced apart from the front surface, and an end of the optical element closest to a rear surface of the substantially transparent medium is spaced apart from the rear surface, wherein a reflective surface of each of the set of pinpoint mirrors at least partially faces the optical element; and
   a virtual image projection component that transmits a virtual image onto the set of pinpoint mirrors,
   wherein the set of pinpoint mirrors transmits the virtual image onto the optical element, and the optical element widens a field of view of the virtual image, such that a user looking through the rear surface of the substantially transparent medium sees the virtual image transposed on a real-world image or a virtual reality image via the optical element, and
   wherein a surface of the optical element faces the first surface, such that the virtual image is transmitted directly from the optical element through the first surface toward a user's eye,
   the virtual image being a first virtual image having been fabricated to have a first focal length and the virtual image projection component being a first virtual image projection component that transmits the first virtual image onto a first pinpoint mirror of the set of pinpoint mirrors;
   the augmented reality view-through device further comprising:
   a second virtual image projection component that transmits a second virtual image different from the first virtual image and having been fabricated to have a second focal length different from the first focal length, through the substantially transparent medium onto a second pinpoint mirror of the set of pinpoint mirrors;
   wherein
   the optical element is a concave mirror,
   a first portion of the optical element reflects the transmitted first virtual image and a second portion, different from the first portion, of the optical element reflects the transmitted second virtual image through the first surface toward the user's eye, and an orientation of the first pinpoint mirror with respect to the first surface is different from an orientation of the second pinpoint mirror with respect to the first surface.

2. The augmented reality view-through device of claim 1, wherein the concave mirror is at least one of purely reflective and semi-transparent.

3. The augmented reality view-through device of claim 1, wherein the set of pinpoint mirrors is an array of pinpoint mirrors, the array comprising a plurality of pinpoint mirrors.

4. The augmented reality view-through device of claim 3, wherein the array has at least one of a plurality of rows of pinpoint mirrors and a plurality of columns of pinpoint mirrors.

5. The augmented reality view-through device of claim 1, wherein each of the set of pinpoint mirrors is no more than 4 mm across according to a perspective of the user.

6. The augmented reality view-through device of claim 1, further comprising a second optical element configured to direct light from the virtual image projection component to the pinpoint mirror.

7. The augmented reality view-through device of claim 1, wherein at least one pinpoint mirror of the set of pinpoint mirrors has an essentially completely reflective surface.

8. The augmented reality view-through device of claim 1, wherein the virtual image projection component comprises a liquid crystal on silicon (LCOS) component.

9. The augmented reality view-through device of claim 1, wherein the substantially transparent medium is a lens material in which the set of pinpoint mirrors are embedded, wherein the virtual image projection component transmits the virtual image to the set of pinpoint mirrors through a first surface of the lens material and the user looking through the lens material sees the virtual image transposed on the real-world image or the virtual reality image through a second surface of the lens material, wherein the second surface of the lens material is not opposite the first surface.

10. The augmented reality view-through device of claim 9, wherein the second surface is configured to permit the user to view a real-world environment or a virtual-world environment.

11. A method for displaying a virtual image in a real-world environment or virtual-world environment, comprising:

transmitting, by a virtual image projection component, a virtual image through a substantially transparent medium onto a set of pinpoint mirrors embedded in the substantially transparent medium, wherein at least one pinpoint mirror of the set of pinpoint mirrors is a full mirror between 2 mm and 8 mm across, the set of pinpoint mirrors arranged such that an end of each of the pinpoint mirrors closest to a front surface of the substantially transparent medium is spaced apart from the front surface, and an end of each of the pinpoint mirrors closest to a rear surface of the substantially transparent medium is spaced apart from the rear surface, and each of the pinpoint mirrors generates a pinhole effect on the virtual image reflected by the pinpoint mirrors;

reflecting, by the set of pinpoint mirrors, the virtual image to transmit the virtual image through the substantially transparent medium onto an optical element, the optical element embedded in the substantially transparent medium such that an end of the optical element closest to a front surface of the substantially transparent medium is spaced apart from the front surface, and an end of the optical element closest to a rear surface of the substantially transparent medium is spaced apart from the rear surface;

widening, via the optical element, a field of view of the virtual image; and providing, via the optical element, a view of the virtual image transposed on a real-world image or a virtual reality image to a user looking through the substantially transparent medium, such that a user looking through a first surface of the substantially transparent medium sees the virtual image transposed on the real-world image or the virtual reality image, wherein a surface of the optical element faces the first surface, such that the virtual image is transmitted directly from the optical element through the first surface toward a user's eye, the virtual image being a first virtual image having been fabricated to have a first focal length and the virtual image projection component being a first virtual image projection component transmitting the first virtual image onto a first pinpoint mirror of the set of pinpoint mirrors, the method further comprising transmitting, by a second virtual image projection component, a second virtual image different from the first virtual image and having been fabricated to have a second focal length different from the first focal length, through the substantially transparent medium onto a second pinpoint mirror of the set of pinpoint mirrors, and reflecting the transmitted first virtual image from a first portion of the optical element and reflecting the transmitted second virtual image from a second portion, different from the first portion, of the optical element, the optical element being a concave mirror, through the first surface toward the user's eye, wherein an orientation of the first pinpoint mirror with respect to the first surface is different from an orientation of the second pinpoint mirror with respect to the first surface.

12. The method of claim 11, wherein each pinpoint mirror of the set of pinpoint mirrors is no more than 4 mm across according to a perspective of the user.

13. The method of claim 11, wherein the set of pinpoint mirrors is an array of pinpoint mirrors, the array comprising a plurality of pinpoint mirrors.

14. The method of claim 13, the method further comprising transmitting, via the virtual image projection component, a first portion of the virtual image through the substantially transparent medium onto a first pinpoint mirror of the set of pinpoint mirrors and transmitting, via the virtual image projection component, a second portion of the virtual image through the substantially transparent medium onto a second pinpoint mirror of the set of pinpoint mirrors.

15. The method of claim 11, the method further comprising transmitting the virtual image through the substantially transparent medium onto the set of pinpoint mirrors via a second optical element.

* * * * *